United States Patent
Yoshioka

(10) Patent No.: US 12,424,662 B2
(45) Date of Patent: Sep. 23, 2025

(54) METHOD FOR MANUFACTURING NONAQUEOUS ELECTROLYTE FOR LITHIUM ION SECONDARY BATTERY AND METHOD FOR MANUFACTURING LITHIUM ION SECONDARY BATTERY USING THE NONAQUEOUS ELECTROLYTE

(71) Applicant: Prime Planet Energy & Solutions, Inc., Tokyo (JP)

(72) Inventor: Masahiro Yoshioka, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 543 days.

(21) Appl. No.: 17/510,028

(22) Filed: Oct. 25, 2021

(65) Prior Publication Data
US 2022/0140397 A1 May 5, 2022

(30) Foreign Application Priority Data

Oct. 30, 2020 (JP) ................. 2020-182244

(51) Int. Cl.
| | | |
|---|---|---|
| *H01M 10/0569* | (2010.01) | |
| *H01M 4/02* | (2006.01) | |
| *H01M 4/04* | (2006.01) | |
| *H01M 4/36* | (2006.01) | |

(Continued)

(52) U.S. Cl.
CPC ..... *H01M 10/0569* (2013.01); *H01M 4/0402* (2013.01); *H01M 4/366* (2013.01); *H01M 10/0525* (2013.01); *H01M 10/0568* (2013.01); *H01M 2004/027* (2013.01); *H01M 2004/028* (2013.01); *H01M 2300/0028* (2013.01)

(58) Field of Classification Search
CPC ........... H01M 10/0569; H01M 4/0402; H01M 4/366; H01M 10/0525; H01M 10/0568; H01M 2004/027; H01M 2004/028; H01M 2300/0028; H01M 10/54; H01M 6/25
See application file for complete search history.

(56) References Cited

U.S. PATENT DOCUMENTS 9,698,450 B2 * 7/2017 Abe .................. H01M 10/4242
2010/0216019 A1   8/2010 Morishima

FOREIGN PATENT DOCUMENTS

| JP | 2000256616 A |   | 9/2000 |
|---|---|---|---|
| JP | 2000344838 A |   | 12/2000 |
| JP | 2001052749 A | * | 2/2001 |

(Continued)

OTHER PUBLICATIONS

Translation of JP2001052749A (Year: 2001).*

*Primary Examiner* — Jonathan G Leong
*Assistant Examiner* — Taeyoung Son
(74) *Attorney, Agent, or Firm* — HAUPTMAN HAM, LLP

(57) ABSTRACT

The present disclosure provides a method for manufacturing a nonaqueous electrolyte capable of reducing the increase in electric resistance of a lithium ion secondary battery reusing an electrode. The method for manufacturing a nonaqueous electrolyte for a lithium ion secondary battery herein disclosed includes the steps of: mixing a prescribed organic solvent and a support electrolyte; and immersing a positive electrode active material, which has been previously subjected to a charging treatment as a positive electrode active material of a lithium ion secondary battery, in a mixed solution obtained by such mixing.

5 Claims, 3 Drawing Sheets

(51) Int. Cl.
*H01M 10/0525* (2010.01)
*H01M 10/0568* (2010.01)

(56) References Cited

FOREIGN PATENT DOCUMENTS

| | | |
|---|---|---|
| JP | 2002175835 A | 6/2002 |
| JP | 200999285 A | 5/2009 |
| JP | 2012-22969 A | 2/2012 |
| JP | 2020-113492 A | 7/2020 |
| WO | 2020/149199 A1 | 7/2020 |

\* cited by examiner

METHOD FOR MANUFACTURING NONAQUEOUS ELECTROLYTE FOR LITHIUM ION SECONDARY BATTERY AND METHOD FOR MANUFACTURING LITHIUM ION SECONDARY BATTERY USING THE NONAQUEOUS ELECTROLYTE

CROSS REFERENCE TO RELATED APPLICATIONS

The present application claims the priority based on Japanese Patent Application No. 2020-182244 filed on Oct. 30, 2020, the entire contents of which are incorporated in the present specification by reference.

BACKGROUND OF THE DISCLOSURE

1. Technical Field

The present disclosure relates to a method for manufacturing a nonaqueous electrolyte for use in a lithium ion secondary battery. Further, the present disclosure relates to a nonaqueous electrolyte manufactured by such a method, and a method for manufacturing a lithium ion secondary battery including a reused electrode.

2. Description of Background

In recent years, secondary batteries such as a lithium ion secondary battery have been preferably used as a portable power supply for a personal computer, a portable terminal, or the like, or a power supply for driving automobiles such as an electric vehicle (EV), a hybrid vehicle (HV), and a plug-in hybrid vehicle (PHV).

A lithium ion secondary battery is a battery that is capable of repeatedly charging and discharging, but, generally, exhibits the deterioration of the electrode, the deterioration of the electrolyte, and the like, caused with long-term use, whereby it becomes impossible to favorably keep the battery performances. However, rare metal elements or the like are used for the electrode of a lithium ion secondary battery. For this reason, from the viewpoints of the cost reduction and the reduction of the environmental load, manufacturing of a lithium ion secondary battery reusing an electrode has been proposed. For example, Japanese Patent Application Publication No. 2012-22969 discloses the technology capable of reusing an electrode by treating (cleaning) the deposits, typified by SEI (solid electrolyte interface) present on the surface of the electrode of a used lithium ion secondary battery, with a polar solvent.

SUMMARY

Incidentally, the present inventors found that for a lithium ion secondary battery reusing an electrode, when a brand-new nonaqueous electrolyte is used, the electric resistance undesirably increases.

Under such circumstances, the present disclosure has been completed in view of the foregoing problem. It is a main object of the present disclosure to provide a method for manufacturing a nonaqueous electrolyte capable of reducing the increase in electric resistance of a lithium ion secondary battery reusing an electrode. Further, it is another object of the present disclosure to provide a method for readily manufacturing a lithium ion secondary battery reduced in an increase in electric resistance by combining such a nonaqueous electrolyte manufacturing method.

A diligent study by the present inventors has revealed that for a lithium ion secondary battery reusing an electrode, the thickness of a high-resistance coating film (SEI) derived from a nonaqueous electrolyte component formed on the surface of the electrode increases with charging. Then, the present inventors considered that this is due to the moisture and the acid component slightly present in the brand-new nonaqueous electrolyte, and repeatedly conducted a study thereon. As a result, the technology herein disclosed has been completed.

Namely, a method for manufacturing a nonaqueous electrolyte for a lithium ion secondary battery herein disclosed, includes the steps of: mixing a prescribed organic solvent and a support electrolyte; and immersing a positive electrode active material, which has been previously subjected to a charging treatment as a positive electrode active material of a lithium ion secondary battery, in a mixed solution obtained by such mixing.

As a result, it is possible to manufacture a nonaqueous electrolyte capable of reducing the increase in electric resistance of a lithium ion secondary battery reusing an electrode.

Further, one preferable aspect herein disclosed is characterized in that in the step of immersing the positive electrode active material, a positive electrode sheet extracted from a lithium ion secondary battery, which has been previously subjected to a charging treatment, and constituted of a collector having a positive electrode mixture material layer including the positive electrode active material is immersed.

As a result, it is possible to manufacture a nonaqueous electrolyte capable of reducing the increase in electric resistance of a lithium ion secondary battery reusing an electrode with more ease.

Further, in accordance with one preferable aspect herein disclosed, the positive electrode sheet is a positive electrode sheet extracted from a lithium ion secondary battery having a potential difference of 3 V or more between positive and negative electrodes.

As a result, it is possible to manufacture a nonaqueous electrolyte capable of still more reducing the increase in electric resistance of a lithium ion secondary battery reusing an electrode.

Further, in accordance with one preferable aspect herein disclosed, the positive electrode active material has a layered rocksalt type structure or a spinel type structure.

As a result, it is possible to manufacture a nonaqueous electrolyte capable of still furthermore reducing the increase in electric resistance of a lithium ion secondary battery reusing an electrode.

Still further, another aspect provides a method for manufacturing a lithium ion secondary battery reusing an electrode combined with the nonaqueous electrolyte manufacturing method herein disclosed. Namely, the method for manufacturing a lithium ion secondary battery herein disclosed is a method for manufacturing a lithium ion secondary battery including an electrode body including at least one of a positive electrode sheet and a negative electrode sheet extracted from a lithium ion secondary battery, which has been previously subjected to a charging treatment, and a nonaqueous electrolyte. The method includes the steps of: constructing an electrode body including at least one of the positive electrode sheet and the negative electrode sheet; and injecting a nonaqueous electrolyte into the constructed electrode body, wherein the nonaqueous electrolyte is a nonaqueous electrolyte manufactured based on the nonaqueous electrolyte manufacturing method herein disclosed.

As a result, it is possible to manufacture a lithium ion secondary battery reduced in an increase in electric resistance with an easy method.

DETAILED DESCRIPTION

Figure 1:
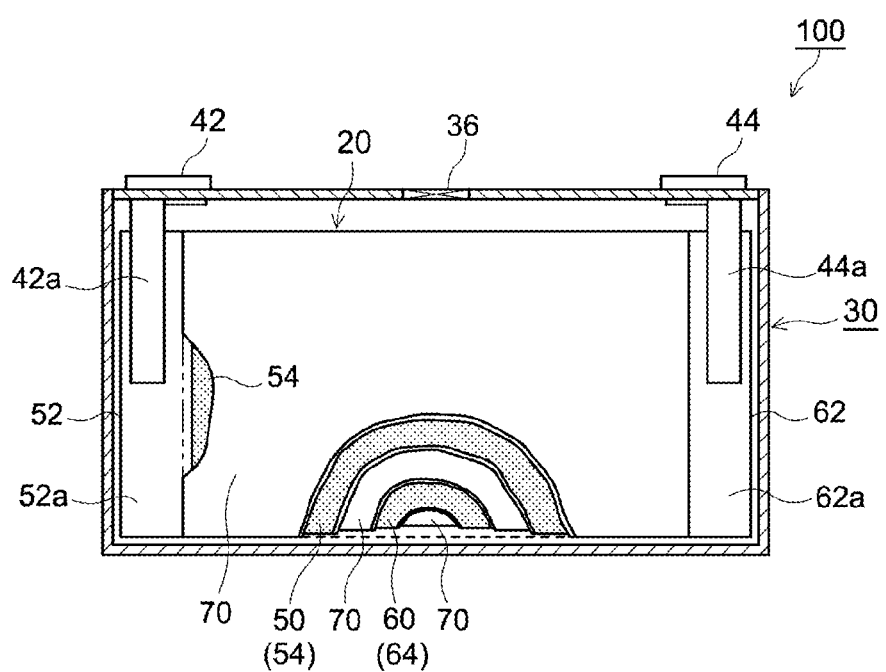
FIG. 1 is a cross sectional view schematically showing a configuration of a lithium ion secondary battery in accordance with one embodiment.

Below, a method for manufacturing a nonaqueous electrolyte herein disclosed, and a method for manufacturing a lithium ion secondary battery reusing an electrode combined with the manufacturing method of the nonaqueous electrolyte will be described in details by reference to the drawing showing one embodiment of a lithium ion secondary battery reusing an electrode (which will be hereinafter also referred to as "regenerated lithium ion secondary battery"). Incidentally, in the present specification, the matters other than matters particularly mentioned in this specification, and required for practicing the present invention can be grasped as design matters of those skilled in the art based on the related art in the present field. The present disclosure can be executed based on the contents disclosed in the present specification, and the technical common sense in the present field. Further, in the following accompanying drawings, the members/parts providing the same effect are given the same numerals and signs, and the repeated description may be omitted or simplified. Further, the dimensional relation (such as length, width, or thickness) in each drawing does not reflect the actual dimensional relation.

Incidentally, in the present specification, expression of a prescribed numerical value range as A to B (each of A and B is a given numerical value) means A or more and B or less, and includes the range of more than A and less than B.

In the present specification, the term "lithium ion secondary battery" denotes a secondary battery using lithium ions as electric charge carriers, and performing charging and discharging by the transfer of electric charges accompanying lithium ions between the positive and negative electrodes. Further, in the present specification, the term "lithium ion secondary battery subjected to a charging treatment" denotes a lithium ion secondary battery subjected to at least one or more charging treatments. Still further, in the present specification, the term "lithium ion secondary battery reusing an electrode" denotes a lithium ion secondary battery including at least one of the positive electrode sheet and the negative electrode sheet extracted from a lithium ion secondary battery subjected to a charging treatment.

A regenerated lithium ion secondary battery 100 shown in FIG. 1 is a square type closed battery constructed by accommodating a flat-shaped electrode body 20, and a nonaqueous electrolyte (not shown) in the inside of a battery case 30. The battery case 30 is provided with a positive electrode terminal 42 and a negative electrode terminal 44 for external connection. Further, the battery case 30 is provided with a thin-walled safety valve 36 set so as to release the internal pressure when the internal pressure of the battery case 30 increases to a prescribed level, or higher. Still further, the battery case 30 is provided with a solution filling port (not shown) for injecting a nonaqueous electrolyte. The material for the battery case 30 is preferably a material made of a metal which has a high strength, is lightweight, and has good thermal conductivity. Examples of such a metal material may include aluminum and stainless steel.

Figure 2:
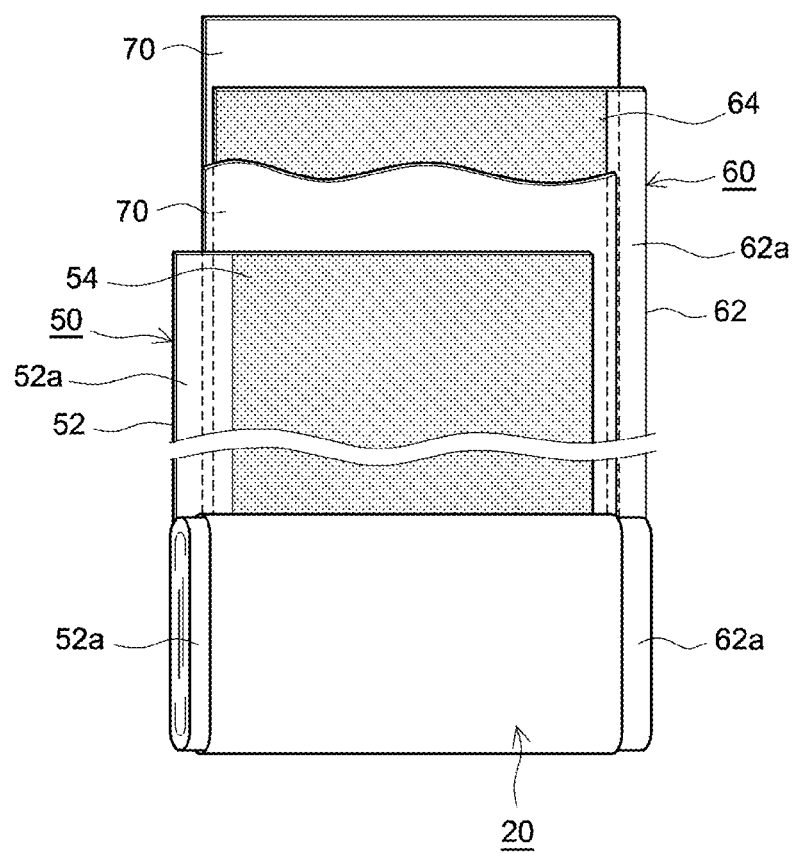
FIG. 2 is a schematic exploded view showing a configuration of a wound electrode body included in the lithium ion secondary battery in accordance with one embodiment.

The electrode body 20 includes any one of a sheet-shaped positive electrode (positive electrode sheet) 50 and a sheet-shaped negative electrode (negative electrode sheet) 60 extracted from a lithium ion secondary battery previously subjected to a charging treatment. As shown in FIG. 1 and FIG. 2, the electrode body 20 is a wound electrode body including the long sheet-shaped positive electrode 50 and the long sheet-shaped negative electrode 60 stacked via two long sheet-shaped separators 70, and wound about the winding axis as the center. The positive electrode 50 includes a positive electrode collector 52, and a positive electrode mixture material layer 54 formed in the longitudinal direction on one side or both sides of the positive electrode collector 52. At the edge part on one side in the winding axis direction (i.e., the sheet width direction orthogonal to the longitudinal direction) of the positive electrode collector 52, there is provided a portion at which a positive electrode mixture material layer 54 is not formed in a band shape along the edge part, and the positive electrode collector 52 is exposed (i.e., positive electrode collector exposed part 52*a*). Whereas, the negative electrode 60 includes a negative electrode collector 62, and a negative electrode mixture material layer 64 formed in the longitudinal direction on one side or both sides of the negative electrode collector 62. At the edge part opposite to the one side in the winding axis direction of the negative electrode collector 62, there is provided a portion at which a negative electrode mixture material layer 64 is not formed in a band shape along the edge part, and the negative electrode collector 62 is exposed (i.e., negative electrode collector exposed part 62*a*). The positive electrode collector exposed part 52*a* and the negative electrode collector exposed part 62*a* are joined with the positive electrode collector sheet 42*a* and the negative electrode collector sheet 44*a*, respectively. The positive electrode collector sheet 42*a* is electrically connected with the positive electrode terminal 42 for external connection, thereby implementing the conduction between the inside and the outside of the battery case 30. Similarly, the negative electrode collector sheet 44*a* is electrically connected with the negative electrode terminal 44 for external connection, thereby implementing the conduction between the inside and the outside of the battery case 30.

Examples of the positive electrode collector 52 forming the positive electrode 50 may include aluminum foil. The positive electrode mixture material layer 54 includes a positive electrode active material. The positive electrode active material may only be the one to be conventionally used for a lithium ion secondary battery. For example, a material capable of occluding and releasing lithium ions, or a lithium-containing compound including a lithium element, and one or two or more transition metal elements (e.g., lithium transition metal composite oxide) can be used. Examples of the lithium transition metal composite oxide may include lithium transition metal oxides having a layered rocks alt type, a spinel type, or an olivine type crystal structure. Examples of such a lithium transition metal oxide may include a ternary system lithium-containing composite oxide such as a lithium nickel composite oxide (e.g., $LiNiO_2$), a lithium cobalt composite oxide (e.g., $LiCoO_2$), a lithium manganese composite oxide (e.g., $LiMn_2O_4$), a lithium nickel manganese composite oxide (e.g., $LiNi_{0.5}Mn_{1.5}O_4$), or a lithium nickel cobalt manganese composite oxide (e.g., $LiNi_{1/3}Co_{1/3}Mn_{1/3}O_2$). Alternatively, a polyanion type compound (e.g., $LiFePO_4$, $LiMnPO_4$, $LiFeVO_4$, $LiMnVO_4$, $Li_2FeSiO_4$, $Li_2MnSiO_4$, or $Li_2CoSiO_4$) as expressed as a general formula of $LiMPO_4$, $LiMVO_4$, or $Li_2MSiO_4$ (where M is at least one or more elements of Co, Ni, Mn, and Fe), or the like may be used as the positive electrode active material.

Further, the positive electrode mixture material layer 54 may include a conductive material, a binder, and the like. As the conductive material and the binder, those to be used in a conventional lithium ion secondary battery can be used.

Examples of the conductive material may include carbon materials such as a carbon powder or a carbon fiber. As the carbon powders, carbon powders such as various carbon blacks (e.g., acetylene black (AB), furnace black, and ketjen black), and graphite powder can be used. As the binder, for example, polyvinylidene fluoride (PVDF) can be used.

The positive electrode mixture material layer 54 can be formed in the following manner: a positive electrode active material, and a material to be used, if required (such as a conductive material or a binder) are dispersed in an appropriate solvent (e.g., N-methyl-2-pyrrolidone: NMP), thereby preparing a paste-shaped (or a slurry-shaped) composition; and a proper amount of the composition is coated on the surface of the positive electrode collector 52, and is dried.

Examples of the negative electrode collector 62 forming the negative electrode 60 may include copper foil. The negative electrode mixture material layer 64 includes a negative electrode active material. As the negative electrode active material, for example, a carbon material such as graphite, hard carbon, or soft carbon can be used. Further, the negative electrode mixture material layer 64 may further include a binder, a thickener, and the like. As the binder, for example, styrene butadiene rubber (SBR) can be used. As the thickener, for example, carboxymethyl cellulose (CMC) can be used.

The negative electrode mixture material layer 64 can be formed in the following manner: a negative electrode active material, and a material (such as a binder) to be used, if required are dispersed in an appropriate solvent (e.g., ion exchanged water), thereby preparing a paste-shaped (or a slurry-shaped) composition; and a proper amount of the composition is coated on the surface of the negative electrode collector 62, and is dried.

As the separator 70, various microporous sheets similar to those conventionally used for a lithium ion secondary battery can be used. Examples thereof may include a microporous resin sheet made of a resin such as polyethylene (PE) or polypropylene (PP). Such a microporous resin sheet may be of a monolayered structure, and may be of a multilayered structure of two or more layers (e.g., a three-layered structure in which PP layers are stacked on the opposite sides of a PE layer). Further, the surface of the separator 70 may be provided with a heat resistant layer (HRL).

Figure 3:
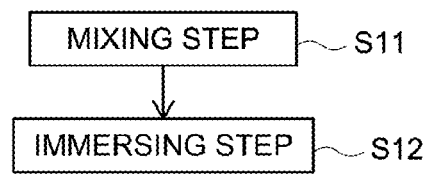
FIG. 3 is a general flowchart for illustrating a manufacturing step of a nonaqueous electrolyte in accordance with one embodiment.

As the nonaqueous electrolyte, those manufactured by the nonaqueous electrolyte manufacturing method herein disclosed can be used. As shown in FIG. 3, the nonaqueous electrolyte manufacturing method herein disclosed includes a step of mixing a prescribed organic solvent (nonaqueous solvent) and a support electrolyte (which will be hereinafter also referred to as a "mixing step") S11, and a step of immersing a positive electrode active material previously subjected to a charging treatment as the positive electrode active material of a lithium ion secondary battery in the mixed solution obtained by the mixing step S11 (which will be hereinafter also referred to as an "immersing step") S12. Below, each step will be described in details.

First, the mixing step S11 will be described. As the constituent components of the nonaqueous electrolyte, the same ones as those for a conventional lithium ion secondary battery can be used. An organic solvent, and a support electrolyte (support salt) are mixed by a known method. As a result, a mixed solution (which will be hereinafter also referred to as a "brand-new nonaqueous electrolyte") can be prepared.

As the organic solvents, aprotic solvents such as carbonates, esters, and ethers can be used. Out of these, carbonates, for example, ethylene carbonate (EC), diethyl carbonate (DEC), dimethyl carbonate (DMC), and ethyl methyl carbonate (EMC) can be preferably adopted. Alternatively, fluorine type solvents of fluorinated carbonates, and the like, such as monofluoroethylene carbonate (MFEC), difluoroethylene carbonate (DFEC), monofluoromethyl difluoromethyl carbonate (F-DMC), and trifluoro dimethyl carbonate (TFDMC) can be preferably used. Such organic solvents can be used singly alone, or in appropriate combination of two or more thereof. As the support salts, for example, lithium salts such as $LiPF_6$, $LiBF_4$, and $LiCLO_4$ can be preferably used. Although the concentration of the support salt has no particular restriction, the concentration is preferably about 0.7 mol/L or more and 1.3 mol/L or less for use.

Incidentally, the mixed solution may further include other components than the organic solvent, and the support salt described above, and can include, for example, various additives such as a gas generator, a film forming agent, a dispersant and a thickener.

Then, the immersing step S12 will be described. First, a lithium ion secondary battery previously subjected to a charging treatment is prepared. Namely, the lithium ion secondary battery includes a positive electrode mixture material layer in which a positive electrode active material previously subjected to a charging treatment is formed on the positive electrode collector surface. Incidentally, the lithium ion secondary battery may only have a general configuration, and may only be configured using, for example, the materials, and the material qualities for use in the regenerated lithium ion secondary battery 100.

Then, a positive electrode active material is extracted from the lithium ion secondary battery subjected to the charging treatment. For example, the positive electrode sheet including a collector having the positive electrode mixture material layer having the positive electrode active material may be extracted all together. Although the potential difference between the positive and negative electrodes when this extracting operation is performed has no particular restriction (e.g., an overcharging state is acceptable), the potential difference between the positive and negative electrodes is preferably 3 V or more (or, SOC is larger than 0%), and may be, for example, 3.5 V or more. Such a state can result in a state in which lithium ions have been released from the positive electrode active material. For this reason, more preferably, the moisture and the acid component which can be included in the mixed solution (brand-new nonaqueous electrolyte) can be adsorbed. As a result, it is possible to suppress the increase in coating film on the electrode surface of the lithium ion secondary battery reusing an electrode. Accordingly, it is possible to preferably reduce the increase in electric resistance. Further, although not particularly restricted, from the viewpoint of the safety of the operation, for example, the electrode is preferably extracted with the potential difference between the positive and negative electrodes set as 3.5 V or less.

The kind of the positive electrode active material to be extracted from the lithium ion secondary battery subjected to the charging treatment has no particular restriction. The positive electrode active material which can be included in the regenerated lithium ion secondary battery 100 can be used. For this reason, for example, a lithium transition metal oxide having a crystal structure of a layered rocksalt type, a spinel type, an olivine type, or the like can be used. Out of these, the positive electrode active material having a layered rocksalt type structure, or a spinel type structure is preferable. With the positive electrode active material having such a structure, it is possible to manufacture a nonaqueous electrolyte capable of still further reducing the increase in electric resistance of the lithium ion secondary battery reusing an electrode.

Then, the extracted positive electrode sheet is immersed in the organic solvent (e.g., EMC) under an inert gas atmosphere (e.g., under an Ar atmosphere) for 10 minutes or more. Incidentally, such organic solvents can be used singly or in combination of two or more thereof. After immersion, the positive electrode sheet is extracted from the solvent, and is subjected to air drying under an inert gas atmosphere. By repeating such operations of immersion and air drying twice or more, it is possible to clean the positive electrode sheet.

Then, the positive electrode active material included in the cleaned positive electrode sheet is immersed in the brand-new nonaqueous electrolyte prepared in the mixing step S11, and is allowed to stand under room temperature in a closed state. As a result, it is possible to manufacture a nonaqueous electrolyte capable of reducing the electric resistance of the lithium ion secondary battery reusing an electrode.

It is essential only that the amount of the positive electrode active material to be immersed is about 70 mg or more (typically, 90 mg or more) for every 100 mL of the brand-new nonaqueous electrolyte. Alternatively, the positive electrode mixture material including the positive electrode active material may be immersed. Still alternatively, the positive electrode sheet including the positive electrode mixture material may be immersed. As a result, it is possible to carry out the nonaqueous electrolyte manufacturing method herein disclosed with more ease. Further, by fragmenting the positive electrode sheet into a given size, it is possible to immerse a given amount of the positive electrode active material.

The immersion time can be appropriately adjusted according to the amount of the positive electrode active material to be immersed. Although not particularly restricted, for example, when the positive electrode sheet including the positive electrode mixture material containing the positive electrode active material in an amount of about 90 mg for every 100 mL of the brand-new nonaqueous electrolyte is immersed, the positive electrode sheet is preferably allowed to stand under room temperature environment for one or more days (e.g., about 24 hours). The immersion for such a time allows the positive electrode active material to sufficiently adsorb and remove the moisture and the acid component included in the brand-new electrolyte. As a result, it is possible to sufficiently exhibit the effect of reducing the increase in electric resistance of the lithium ion secondary battery reusing an electrode.

Figure 4:
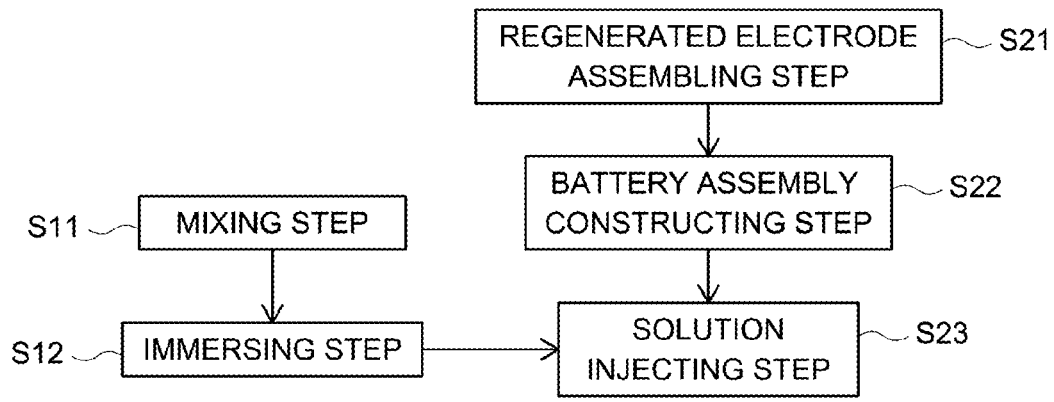
FIG. 4 is a general flowchart for illustrating a manufacturing step of a lithium ion secondary battery in accordance with one embodiment.

Further, a method for manufacturing a lithium ion secondary battery reusing an electrode combined with the nonaqueous electrolyte manufacturing method herein disclosed is provided. As shown in FIG. 4, the method for manufacturing the lithium ion secondary battery reusing an electrode herein disclosed includes a step (which will be hereinafter also referred to as a "regenerated electrode body assembling step") S21 of constructing an electrode body including at least one of the positive electrode sheet and the negative electrode sheet extracted from the lithium ion secondary battery previously subjected to a charging treatment, and a step (below, "battery assembly constructing step") S22 of assembling a lithium ion secondary battery including the electrode body, and a step (which will be hereinafter also referred to as a "solution injecting step") S23 of injecting a nonaqueous electrolyte manufactured by the manufacturing method herein disclosed into the electrode body. Herein, a description will be given by taking the method for manufacturing the regenerated lithium ion secondary battery 100 shown in FIG. 1 as an example.

First, the regenerated electrode body assembling step S21 will be described. The positive electrode sheet and/or the negative electrode sheet extracted from the lithium ion secondary battery previously subjected to a charging treatment is cleaned with the same method as the cleaning method of the positive electrode sheet described in the immersing step S12. The assembling method of the electrode body 20 has no particular restriction. Based on a known method, the electrode body 20 including the positive electrode sheet and/or the negative electrode sheet after cleaning can be assembled. Incidentally, the positive electrode sheet to be herein used may be the residual portion when it is partially fragmented for being used in the immersing step S12. Further, the lithium ion secondary battery previously subjected to a charging treatment is preferably not fully discharged (SOC is 0%). In such a case, the electrode included in the lithium ion secondary battery may be deteriorated. For this reason, the battery performances of the regenerated lithium ion secondary battery may become insufficient.

Then, the battery assembly constructing step S22 will be described. It is essential only that such construction is carried out based on a known method. For example, only the following procedure is desirable: the positive electrode collector sheet 42*a* and the negative electrode collector sheet 44*a* are joined to the electrode body 20 manufactured in the regenerated electrode body assembling step S21, and further are joined with the positive electrode terminal 42 or the negative electrode terminal 44, which is then accommodated in the battery case 30 in a hermetically sealed state. Incidentally, the positive electrode collector sheet 42*a* may be previously joined with the positive electrode terminal 42, and the negative electrode collector sheet 44*a* may be previously joined with the negative electrode terminal 44.

Finally, the solution injecting step S23 will be described. It is essential only that the solution injecting method is carried out based on a known method. Typically, the nonaqueous electrolyte manufactured with the nonaqueous electrolyte manufacturing method herein disclosed is injected through the solution filling port provided at the battery case 30. Subsequently, the solution filling port is sealed, and is thereby hermetically sealed. As a result, the regenerated lithium ion secondary battery 100 can be manufactured.

The regenerated lithium ion secondary battery 100 manufactured with such a method can be used for various applications. For example, the regenerated lithium ion secondary battery 100 can be preferably used as a high output power source (driving power supply) for a motor to be mounted on a vehicle. The kind of the vehicle has no particular restriction. Typically, mention may be made of cars such as a plug-in hybrid vehicle (PHV), a hybrid vehicle (HV), and an electric vehicle (EV). The regenerated lithium ion secondary battery 100 can also be used in the form of an assembled battery including a plurality of batteries electrically connected to one another.

Up to this point, as one example, a square type regenerated lithium ion secondary battery including a flat shape wound electrode body has been described. However, this is merely one example, and is not exclusive. For example, in place of the wound electrode body, a laminated electrode body including a plurality of positive electrode sheets and negative electrode sheets stacked alternately via separators may be included. Alternatively, a laminate type lithium ion secondary battery using a laminate film in place of a square type battery case is also acceptable.

Below, Examples regarding the present disclosure will be described. However, it is not intended that the present disclosure is limited to those shown in such Examples.

Examples 1 to 5

Construction of Lithium Ion Secondary Battery

A lithium nickel cobalt manganese composite oxide ($LiNi_{1/3}Co_{1/3}Mn_{1/3}O_2$, which will be hereinafter also referred to as "NCM") having a layered rocksalt type structure as a positive electrode active material, acetylene black (AB) as a conductive material, and polyvinylidene fluoride (PVDF) as a binder were mixed in N-methyl-2-pyrrolidone so as to achieve a mass ratio of NCM:AB:PVDF=90:8:2, thereby preparing a positive electrode mixture material layer forming paste. The paste was coated on an aluminum foil collector, and was dried, followed by pressing, thereby manufacturing a positive electrode sheet.

Natural graphite (C) as a negative electrode active material, styrene butadiene rubber (SBR) as a binder, and carboxymethyl cellulose (CMC) as a thickener were mixed in ion exchanged water so as to achieve a mass ratio of C:SBR:CMC=98:1:1, thereby preparing a negative electrode mixture material layer forming paste. The paste was coated on a copper foil collector, and dried, followed by pressing, thereby manufacturing a negative electrode sheet.

Further, a porous polyolefine sheet having a three layered structure of PP/PE/PP was prepared as a separator.

The manufactured positive electrode sheet and negative electrode sheet were stacked opposed to each other via the separator, thereby manufacturing a laminated electrode body. A collector terminal was attached to the laminated electrode body, which was accommodated in an aluminum laminate type bag. Then, the laminated electrode body was impregnated with a nonaqueous electrolyte, thereby sealing the opening of the aluminum laminate type bag for hermetically sealing. As a result, a lithium ion secondary battery was manufactured. As the nonaqueous electrolyte, the one obtained by dissolving $LiPF_6$ as a support salt in a mixed solvent including ethylene carbonate (EC), dimethyl carbonate (DMC), and ethyl methyl carbonate (EMC) at a volume ratio of 3:4:3 in a concentration of 1.0 mol/L was used. In the manner described up to this point, a lithium ion secondary battery was obtained.

Activating Treatment

The manufactured lithium ion secondary battery was subjected to constant current charging up to 4.1 V at a current rate of 0.1 C to ⅓ C under 25° C. environment, and then was subjected to constant voltage charging until the current rate became 1/50 C, resulting in a fully charged state. Subsequently, the lithium ion secondary battery was subjected to constant current discharging to 3.0 V at a current rate of 0.1 C to ⅓ C. Incidentally, the term "1 C" herein denotes the magnitude of the current for setting SOC at from 0% to 100% in 1 hour.

Construction of Regenerated Lithium Ion Secondary Battery

The lithium ion secondary battery subjected to the activating treatment was disassembled, and the electrodes (the positive electrode sheet and the negative electrode sheet) were extracted. The electrodes were immersed in a large amount of an EMC solvent for 10 minutes, and cleaned. Subsequently, the electrodes were extracted from the EMC solvent, and subjected to air drying. The operations of cleaning and drying were performed twice. Incidentally, the operations of cleaning and drying were performed under an Ar inerting atmosphere. Using the electrodes obtained in this manner, another lithium ion secondary battery (regenerated lithium ion secondary battery) was manufactured in the same manner as the construction method of the lithium ion secondary battery. However, for the nonaqueous electrolytes used in the regenerated lithium ion secondary battery, those shown in Examples 1 to 5 were used, respectively.

Nonaqueous Electrolyte Used for Regenerated Lithium Ion Secondary Battery

Example 1

A "brand-new electrolyte" was used which was obtained by dissolving $LiPF_6$ as a support salt in a mixed solvent including ethylene carbonate (EC), dimethyl carbonate (DMC), and ethyl methyl carbonate (EMC) at a volume ratio of 3:4:3 in a concentration of 1.0 mol/L.

Example 2

A fragment was cut out from the manufactured brand-new positive electrode sheet including NCM so that the positive electrode mixture material layer may be in an amount of about 0.1 g. Then, the fragment was impregnated in 100 mL of the brand-new electrolyte in an airtight container. Then, the fragment was allowed to stand under room temperature for 24 hours, and then a "brand-new NCM positive electrode immersion solution" from which the fragment had been removed was manufactured, and used.

Example 3

A lithium ion secondary battery after an activating treatment was manufactured separately with the foregoing method. The lithium ion secondary battery was disassembled with the potential difference between the positive and negative electrodes of the lithium ion secondary battery being 1.5 V (in an overcharging state, a state of a SOC of 0% or less), and the positive electrode sheet was extracted. The positive electrode sheet was cleaned in the same manner as the cleaning operation of the electrode described above. Then, the same operation as that in Example 2 was performed, thereby manufacturing a "1.5-V disassembled NCM positive electrode immersion solution", which was used.

Example 4

A "3-V disassembled NCM positive electrode immersion solution" was manufactured by performing the same operation as that in Example 3, except that the potential difference between the positive and negative electrodes upon disassembling the lithium ion secondary battery was set at 3 V, and this was used.

Example 5

A "3.5-V disassembled NCM positive electrode immersion solution" was manufactured by performing the same operation as that in Example 3, except that the potential difference between the positive and negative electrodes upon disassembling the lithium ion secondary battery was set at 3.5 V, and this was used.

Measurement of IV Resistance Value

For each of the manufactured regenerated lithium ion secondary batteries, constant current charging was performed up to a SOC of 100% at a current rate of 1 C under 25° C. environment. Then, constant current discharging was performed until the SOC became 0%. Subsequently, constant current charging was performed up to a SOC of 50%. Then, the regenerated lithium ion secondary battery was allowed to stand under 0° C. environment for 3 hours, and then, 10-second constant current charging and discharging were performed in the order of 0.2 C, 0.5 C, 1 C, and 2 C. Incidentally, in the 10-second constant current charging and discharging, a standing time of 10 minutes was provided for changing the current rate. From the slope of the graph of current (I) and voltage (V) obtained therefrom, the IV resistance value (V/I) was calculated. Table 1 shows the IV resistance ratio when IV resistance value of Example 1 is set at 1.00.

TABLE 1

| | Kind of positive electrode active material | Kind of nonaqueous electrolyte | IV resistance ratio |
|---|---|---|---|
| Example 1 | Layered rocksalt type structure | Brand-new electrolyte | 1.00 |
| Example 2 | | Brand-new NCM positive electrode immersion solution | 1.02 |
| Example 3 | | 1.5-V disassembled NCM positive electrode immersion solution | 0.94 |
| Example 4 | | 3-V disassembled NCM positive electrode immersion solution | 0.87 |
| Example 5 | | 3.5-V disassembled NCM positive electrode immersion solution | 0.86 |

Example 6

A regenerated lithium ion secondary battery was obtained in the same manner as in Example 1, except that the positive electrode active material included in the lithium ion secondary battery was changed from the NCM to a lithium nickel manganese composite oxide having a spinel type structure ($LiNi_{0.5}Mn_{1.5}O_4$, which will be hereinafter also referred to as "NM"), and that in the activating treatment, constant current charging was performed up to 4.2 V.

Example 7

A regenerated lithium ion secondary battery was obtained in the same manner as in Example 2, except that the positive electrode active material included in the lithium ion secondary battery was changed from the NCM to the NM, and that in the activating treatment, constant current charging was performed up to 4.2 V. Namely, the regenerated lithium ion secondary battery of Example 7 includes a "brand-new NM positive electrode immersion solution".

Example 8

A regenerated lithium ion secondary battery was obtained in the same manner as in Example 5, except that the positive electrode active material included in the lithium ion secondary battery was changed from the NCM to the NM, and that in the activating treatment, constant current charging was performed up to 4.2 V. Namely, the regenerated lithium ion secondary battery of Example 8 includes a "3.5-V disassembled NM positive electrode immersion solution".

The IV resistance values of Examples 6 to 8 were measured in the same manner as in Examples 1 to 5. Table 2 shows the IV resistance ratio when the IV resistance value of Example 6 is set at 1.00.

TABLE 2

| | Kind of positive electrode active material | Kind of nonaqueous electrolyte | IV resistance ratio |
|---|---|---|---|
| Example 6 | Spinel type structure | Brand-new electrolyte | 1.00 |
| Example 7 | | Brand-new NM positive electrode immersion solution | 1.03 |
| Example 8 | | 3.5-V disassembled NM positive electrode immersion solution | 0.84 |

Example 9

A regenerated lithium ion secondary battery was obtained in the same manner as in Example 1, except that the positive electrode active material included in the lithium ion secondary battery was changed from the NCM to lithium iron phosphate ($LiFePO_4$, which will be hereinafter also referred to as "LFP") having an olivine type structure.

Example 10

A regenerated lithium ion secondary battery was obtained in the same manner as in Example 2, except that the positive electrode active material included in the lithium ion secondary battery was changed from the NCM to the LFP. Namely, the regenerated lithium ion secondary battery of Example 10 includes a "brand-new LFP positive electrode immersion solution".

Example 11

A regenerated lithium ion secondary battery was obtained in the same manner as in Example 5, except that the positive electrode active material included in the lithium ion secondary battery was changed from the NCM to the NM. Namely, the regenerated lithium ion secondary battery of Example 11 includes a "3.5-V disassembled LFP positive electrode immersion solution".

The IV resistance values of Examples 9 to 11 were measured in the same manner as in Examples 1 to 5. Table 3 shows the IV resistance ratio when the IV resistance value of Example 9 is set at 1.00.

TABLE 3

| | Kind of positive electrode active material | Kind of nonaqueous electrolyte | IV resistance ratio |
|---|---|---|---|
| Example 9 | Olivine type structure | Brand-new electrolyte | 1.00 |
| Example 10 | | Brand-new LFP positive electrode immersion solution | 1.02 |
| Example 11 | | 3.5-V disassembled LFP positive electrode immersion solution | 0.95 |

As shown in Tables 1 to 3, Examples 3 to 5, Example 8, and Example 11 each had a lower IV resistance ratio than those of Example 1, Example 6, and Example 9 using a brand-new electrolyte. This indicates that by using an electrolyte in which a positive electrode sheet including a positive electrode active material previously subjected to a charging treatment was immersed for the regenerated lithium ion secondary battery, it is possible to suppress the increase in electric resistance irrespective of the kind of the positive electrode active material.

Further, the IV resistance ratios of Example 4 and Example 5 were lower than that of Example 3. This indicates as follows: when the positive electrode sheet to be immersed in the brand-new nonaqueous electrolyte is extracted, the potential difference between the positive and negative electrodes of the lithium ion secondary battery including the positive electrode sheet is set at 3 V or more; as a result, it is possible to more preferably suppress the increase in electric resistance.

Further, the IV resistance ratios of Example 5 and Example 7 were particularly low. Accordingly, conceivably, by impregnating the positive electrode active material having a layered rocksalt type crystal structure or a spinel type crystal structure in a brand-new nonaqueous electrolyte, it is possible to more preferably suppress the increase in electric resistance.

Up to this point, the specific examples of the present disclosure were described in details. However, these are merely illustrative, and should not be construed as limiting the scope of the appended claims. The technology described in the appended claims includes various modifications and changes of the specific examples shown up to this point.

What is claimed is:

1. A method for manufacturing a lithium ion secondary battery,
    the method comprising the steps of:
        mixing a prescribed organic solvent and a support electrolyte to form a mixed solution;
        immersing a first positive electrode active material, which has been previously subjected to a charging treatment as a positive electrode active material of a first lithium ion secondary battery, in the mixed solution;
        removing the first positive electrode active material from the mixed solution; and
        injecting the mixed solution into a battery case containing a second positive electrode active material, wherein
    the crystal structure of the first positive electrode active material and the second positive electrode active material are same,
    the second positive electrode active material has been previously subjected to a charging treatment as a positive electrode active material of a second lithium ion secondary battery,
    the second lithium ion secondary battery is different from the first lithium ion secondary battery.

2. The lithium ion secondary battery manufacturing method according to claim 1,
    wherein in the step of immersing the first positive electrode active material, a first positive electrode sheet extracted from a first lithium ion secondary battery, which has been previously subjected to a charging treatment, and constituted of a collector having a positive electrode mixture material layer including the first positive electrode active material is immersed.

3. The lithium ion secondary battery manufacturing method according to claim 2,
    wherein the first positive electrode sheet is a positive electrode sheet extracted from a lithium ion secondary battery having a potential difference of 3 V or more between positive and negative electrodes.

4. The lithium ion secondary battery manufacturing method according to claim 1,
    wherein the first positive electrode active material and the second positive electrode active material has a layered rocksalt type structure or a spinel type structure.

5. A method for manufacturing a second lithium ion secondary battery including an electrode body including at least one of a second positive electrode sheet and a negative electrode sheet extracted from a lithium ion secondary battery, which has been previously subjected to a charging treatment, and a nonaqueous electrolyte,
    the method comprising the steps of:
        constructing an electrode body including at least one of the second positive electrode sheet and the negative electrode sheet;
        preparing a nonaqueous electrolyte, wherein preparing the nonaqueous electrolyte comprises:
        mixing a prescribed organic solvent and a support electrolyte to form a mixed solution;
        immersing a first positive electrode active material, which has been previously subjected to a charging treatment as a positive electrode active material of a first lithium ion secondary battery, in the mixed solution;
        removing the first positive electrode active material from the mixed solution; and
        injecting the nonaqueous electrolyte into the constructed electrode body having the second positive electrode active material following removing the first positive electrode active material from the mixed solution.

* * * * *